(12) United States Patent
Song et al.

(10) Patent No.: US 8,966,706 B2
(45) Date of Patent: Mar. 3, 2015

(54) WIPER DEVICE

(75) Inventors: Kyoung-Joon Song, Daegu (KR); Sang-Cheol Lee, Daegu (KR)

(73) Assignee: CAP Corporation (KR)

( * ) Notice: Subject to any disclaimer, the term of this patent is extended or adjusted under 35 U.S.C. 154(b) by 308 days.

(21) Appl. No.: 13/496,879

(22) PCT Filed: Feb. 1, 2011

(86) PCT No.: PCT/KR2011/000720
§ 371 (c)(1),
(2), (4) Date: Mar. 17, 2012

(87) PCT Pub. No.: WO2011/139014
PCT Pub. Date: Nov. 10, 2011

(65) Prior Publication Data
US 2012/0174334 A1 Jul. 12, 2012

(30) Foreign Application Priority Data

May 3, 2010 (KR) .................. 10-2010-0041350

(51) Int. Cl.
*B60S 1/38* (2006.01)

(52) U.S. Cl.
CPC ........ *B60S 1/3801* (2013.01); *B60S 2001/3815* (2013.01)
USPC .................. 15/250.46; 15/250.44; 15/250.361

(58) Field of Classification Search
CPC ........... B60S 1/3801; B60S 2001/3815; B60S 1/0405; B60S 1/0491; B60S 1/3479; B60S 2001/3843; B60S 2001/4035; B60S 2001/4061

USPC ............ 15/250.44, 250.451–250.48, 250.32, 15/250.361, 250.43, 250.201, 250.46, 15/250.39

See application file for complete search history.

(56) References Cited

U.S. PATENT DOCUMENTS

| 2,876,482 | A | * | 3/1959 | Oishei | .................. | 15/250.44 |
| 4,360,941 | A | * | 11/1982 | Mabie | .................. | 15/250.06 |
| 5,862,567 | A | * | 1/1999 | Kim | .................. | 15/250.201 |

(Continued)

FOREIGN PATENT DOCUMENTS

| DE | 19938662 A1 | * | 3/2001 | ............... | B60S 1/38 |
| JP | 2006089043 | | 4/2006 | | |

(Continued)

OTHER PUBLICATIONS

DE19938662A1 (machine translation), 2001.*

(Continued)

*Primary Examiner* — Mark Spisich
*Assistant Examiner* — Andrew A Horton
(74) *Attorney, Agent, or Firm* — Brooks Kushman PC

(57) ABSTRACT

A windshield wiper device having a frame; a first lever, provided in a pair, each being hinge-coupled to either end of the frame and including an inside arm extending toward a hinge and an outside arm extending away from the hinge. A pair of second levers, are provided, each being hinge-coupled to an end portion of the outside arm of the first lever. A contact member, forms a blade in close contact with the windshield to wipe out the foreign substances and is supported by an end portion of the inside arm of the first lever and both end portions of the second lever; and a cover member. The cover member covers the frame, the first lever and the second lever.

3 Claims, 4 Drawing Sheets

(56) References Cited

U.S. PATENT DOCUMENTS 6,973,697 B2 * 12/2005 Shen .................. 15/250.201
2005/0211272 A1 * 9/2005 Javaruski et al. ............ 134/6

FOREIGN PATENT DOCUMENTS

| JP | 2006312457 | 11/2006 |
| JP | 2010089750 | 4/2010 |

OTHER PUBLICATIONS

International Search Report for PCT/KR2011/000720, English translation attached to original, Both completed by the Korean Patent Office on Oct. 14, 2011, All together 7 Pages.

* cited by examiner

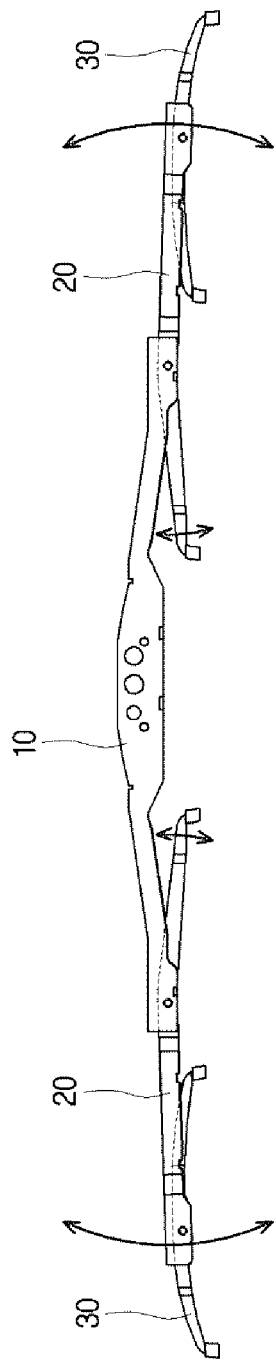
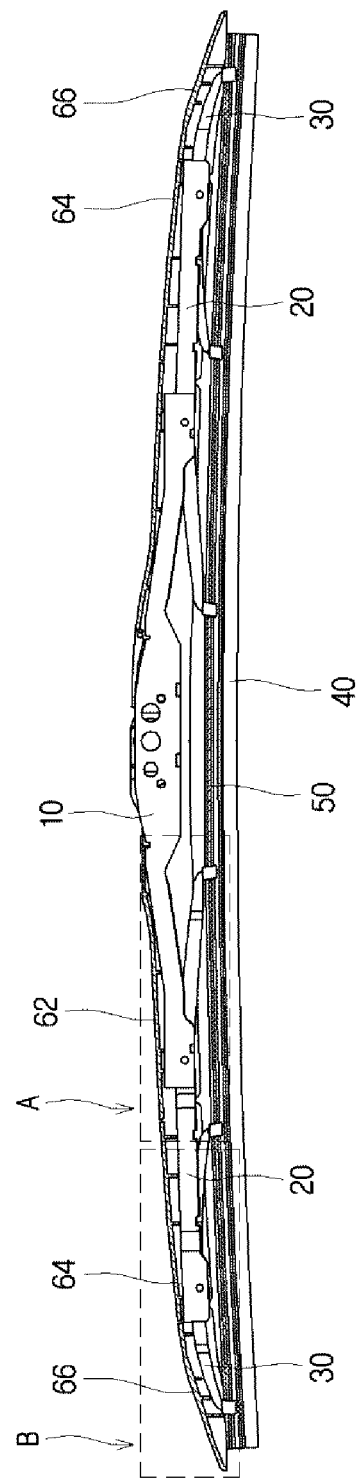

WIPER DEVICE

CROSS-REFERENCE TO RELATED APPLICATION

This application is the U.S. national phase of PCT Appln. No. PCT/KR2011/000720 filed Feb. 1, 2011, which claims priority to KR application 10-2010-0041350 filed on May 3, 2010 the disclosures of which are incorporated in their entirety by reference herein.

BACKGROUND OF THE INVENTION

1. Technical Field

The present invention is related to a wiper device.

2. Background Art

Generally, visibility is interfered and safety is compromised if the windshield of a motor vehicle that is in motion is contaminated by the dust or various foreign substances in the air or the rain or snow due to weather conditions. Accordingly, motor vehicles are equipped with a wiper device for wiping out the rain, snow or other foreign substances from the windshield in order to secure the visibility for safe driving of the driver.

There are generally two types of wiper devices according to the method of supporting the blade that is in close contact with the windshield to wipe out the foreign substances.

The first type is a tournament structure of wiper device, which has multiple layers of levers, end of each lever supporting the blade. However, the tournament structure of wiper device has shortcomings of tall height and inferior appearance due to the multiple layers of levers. More specifically, due to the tall height of its middle portion, the blade of the wiper device can be levitated during high-speed driving, and it becomes difficult to install a cover to complement the inferior appearance.

The second type is a plate-type structure of wiper device, which supports the blade by coupling a support rail or a body spring having curvature and elasticity to the blade. The plate-type structure of wiper device has a low height, is integrated with the blade, and has a simple appearance. However, no matter how good the elasticity of the body spring is, it is still not possible to impeccably clean the entire sections of the windshield, which has different curvature for different vehicle types. Moreover, when the wiper device is activated and is moved to a different position having different curvature, the surface compliance becomes lower at end portions of the wiper device, that is, the wiper device partially comes off from the windshield.

Contrived to complement the above problems is a structure in which the plate-type structure is reinforced with the tournament structure. However, this structure of wiper device has not solved the problem of increased height of the entire wiper device and the surface compliance issue because its levers support a limited portion of the middle section.

SUMMARY OF THE INVENTION

The present invention provides a wiper device that has a superb appearance and good surface compliance with a windshield.

An aspect of the present invention features a wiper device for removing foreign substances that are stuck on a windshield. The wiper device in accordance with an embodiment of the present invention can include: a frame; a first lever, provided in a pair, each being hinge-coupled to either end of the frame and including an inside arm extended toward an inside of the frame from a hinge and an outside arm extended toward an outside of the frame from the hinge; a second lever, provided in a pair, each being hinge-coupled to an end portion of the outside arm of the first lever; a contact member, formed in the shape of a blade in close contact with the windshield so as to wipe out the foreign substances and being supported by an end portion of the inside arm of the first lever and both end portions of the second lever; and a cover member, covering the frame, the first lever and the second lever. The inside arm of the first lever can be formed to be shorter than the outside arm of the first lever so as to lower a height of the cover member.

The wiper device can also include an elastic member extended in a lengthwise direction of the contact member to elastically support the contact member.

Opposite-side lateral surfaces of the contact member can be formed with a pair of installation grooves, respectively, in the lengthwise direction of the contact member, and a pair of rail springs can be inserted in the installation grooves, respectively.

The cover member can include: a center cover, coupled to the frame and covers the frame and the inside arm 22 of the first lever; a first extension cover, provided in a pair, each being coupled to the outside arm of the first lever and covering the outside arm and a portion of the second lever; and a second extension covers, in a pair, each being coupled to the second lever and covering the remaining portion of the second cover.

BRIEF DESCRIPTION OF THE DRAWINGS

FIG. 3 illustrates the structure of a lever in the wiper device in accordance with an embodiment of the present invention.

FIGS. 4 to 6 are cross-sectional views showing the wiper device in accordance with an embodiment of the present invention.

DETAILED DESCRIPTION OF THE INVENTION

Hereinafter, an embodiment of the present invention will be described with reference to the accompanying drawings.

Figure 1:
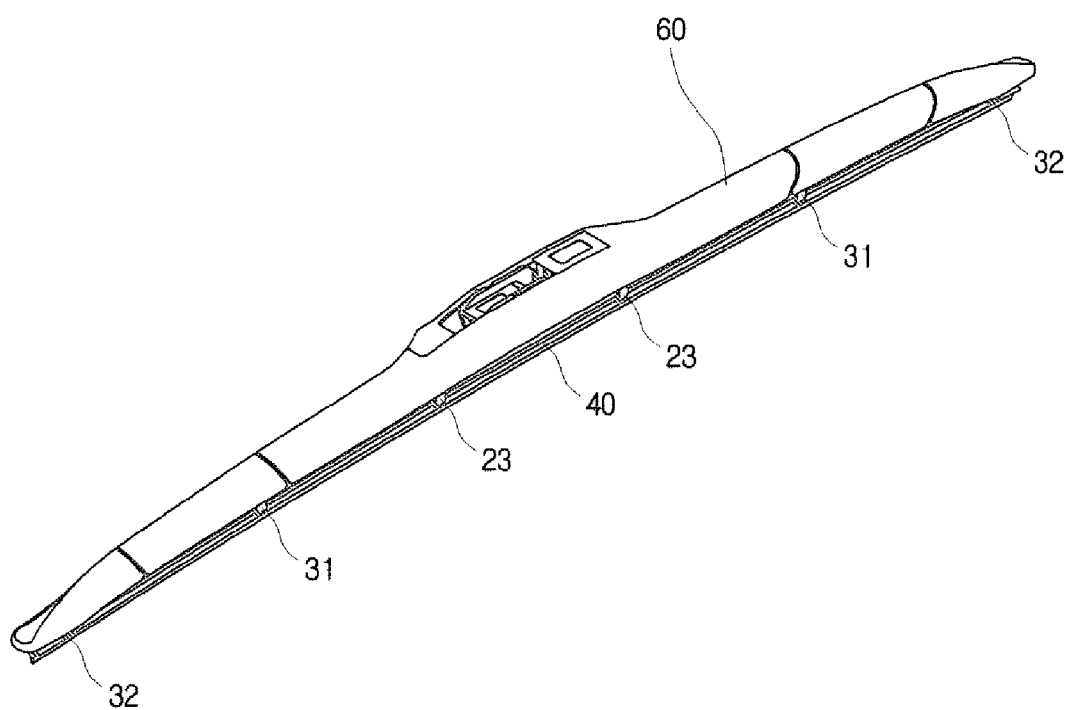
FIG. 1 is a perspective view showing a wiper device in accordance with an embodiment of the present invention.
Figure 2:
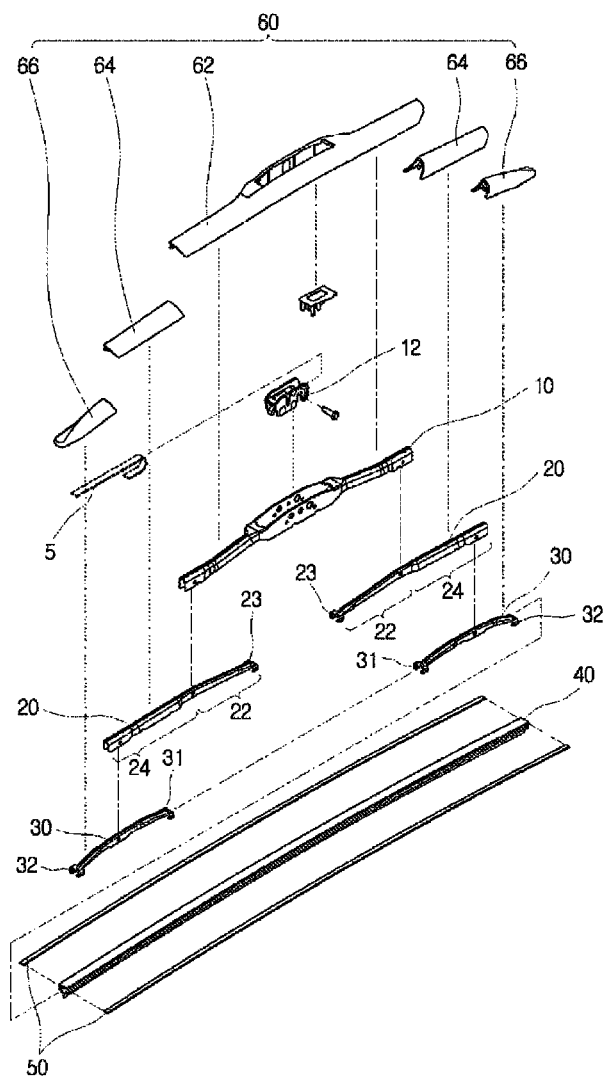
FIG. 2 is an exploded perspective view showing the wiper device in accordance with an embodiment of the present invention.

FIG. 1 is a perspective view showing a wiper device in accordance with an embodiment of the present invention, and FIG. 2 is an exploded perspective view showing the wiper device in accordance with an embodiment of the present invention.

The wiper device in accordance with an embodiment of the present invention is a device for removing foreign substances that are stuck on a windshield of, for example, a motor vehicle and includes a frame 10, a first lever 20, a second lever 30, a contact member 40 and a cover member 60.

The wiper device of the present embodiment features a tournament type of support structure, which is constituted with the frame 10, the first lever 20 and the second lever 30 and uniformly supports the contact member 40 entirely but is formed in a low height, minimizing a height of the cover member 60 for a superb appearance of the wiper device.

The frame 10 is a central part of the tournament type of support structure. That is, the first lever 20 and the second lever 30 can be successively coupled to both ends of the frame 10. Also, a wiper arm 5, or the like, which is for driving the wiper device, can be connected to the frame 10. For this, an adaptor 12, which is coupled to the wiper arm 5, can be coupled to the wiper device.

A pair of the first levers 20 are hinge-coupled to either end of the frame 10 to support the second levers 30 and the contact member 40. For this, the first lever 20 has an outside arm 24 for supporting the second lever 30 and an inside arm 22 for supporting the contact member 40. The second lever 30 is hinge-coupled to an end portion of the outside arm 24 of the first lever 20 to support the contact member 40.

In the first lever 20 of the present embodiment, the inside arm 22, which is extended toward an inside of the frame 10 from a hinge, is formed to be shorter than the outside arm 24, which is extended toward an outside of the frame 10 from the hinge, thereby lowering the height of the tournament type of support structure.

FIG. 3 illustrates the structure of the levers in the wiper device in accordance with an embodiment of the present invention.

When the wiper device is activated in close contact with the windshield, both end portions of the wiper device need to fluctuate against a curvature of the windshield in order for the contact member 40 to be in close contact with the windshield evenly. Accordingly, the end portions of the wiper device, i.e., the second levers 30, need to fluctuate greatly. However, as fluctuation of the second levers 30 increases, fluctuation of the outside arms 24 of the first levers 20 that support the second levers 30 also increases, causing the inside arms 22 to fluctuate greatly. If fluctuation of the inside arms 22 increases, a middle portion of the frame 10 needs to be formed higher in order to avoid interference (i.e., bumping) with the frame 10, inevitably increasing the overall height of the wiper device. The increased height of the wiper device makes it difficult to install a cover. Conventionally, since only a middle portion of the contact member 40 has been supported in a tournament structure (e.g., in a four-point support structure with the frame 10 and the first levers 20), a height of the wiper device could be made lower, but some of surface compliance had to be sacrificed.

In order to solve this problem fundamentally, the present invention forms the inside arm 22 of the first lever 20 to be shorter than the outside arm 24 of the first lever 20. Accordingly, even if large fluctuation of the second lever 30 causes the outside arm 24 of the first lever 20 to fluctuate greatly, a small amount of fluctuation is formed for the inside arm 22. Accordingly, it becomes possible to decrease the height of the middle portion of the frame 10 to install the cover member 60. Moreover, as the heights of the end portions and middle portion of the wiper device can be more even, the wiper device can have a smooth appearance, as shown in FIG. 1.

In addition, the entire contact member 40 is supported more evenly by both end portions of the second lever 30 as well as an end portion of the inside arm 22 of the first lever 20, thereby improving the surface compliance. Although the conventional wiper device could practically have a four-point support only due to the height issue, the present embodiment is possible to provide a six-point support while maintaining a low height. The six-point support structure can evenly distribute the pressure of the wiper arm 5 that starts from the adaptor 12, which is located in the middle portion of the frame 10, delivering even pressure to the entire contact member 40 to provide uniform cleaning functionality.

The contact member 40, which is a part that is in close contact with the windshield and wipes out foreign substances, is formed in the shape of a blade and is supported by an end part 23 of the inside arm 22 of the first lever 20 and both end portions 31, 32 of the second lever 30. The contact member 40 of the present embodiment can be any kind of conventional contact member, for example, the rubber-made wiper.

Here, the wiper device in accordance with the present embodiment can additionally include an elastic member 50 that is extended in a lengthwise direction of the contact member 40 and elastically supports the contact member 40 in such a way that the contact member 40 can be in a better contact with the windshield.

Specifically, in the present embodiment, opposite-side lateral surfaces of the contact member 40 can be formed with a pair of installation grooves, respectively, in the lengthwise direction of the contact member 40, and a pair of rail springs, which are the elastic member 50, can be inserted in the installation grooves, respectively. The elastic member 50 is not restricted to what is described herein but can be embodied in various forms, for example, a body spring, as long as it can elastically support a back side of the contact member 40.

The cover member 60 allows the wiper device of the present embodiment to have a simple, smooth appearance, as shown in FIG. 1, by covering the tournament structure of the frame 10, the first levers 20 and the second levers 30. In the present embodiment, the cover member 60 can be readily installed because the tournament structure is formed in a low, uniform height, as described above.

In addition, as the cover member 60 of the present embodiment can be fluctuated along with the fluctuating first levers 20 and the second levers 30, it becomes possible to prevent the tournament structure from being exposed to the outside while the wiper device is activated.

Figure 5:
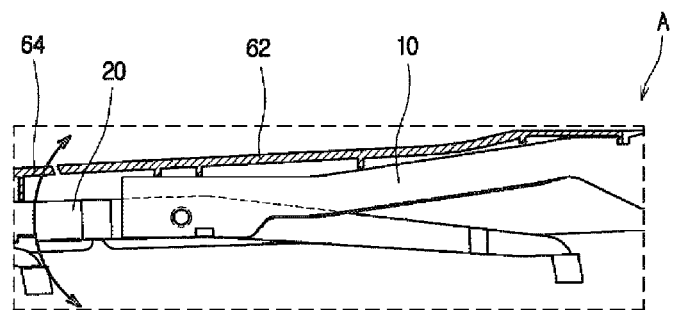
Figure 6:
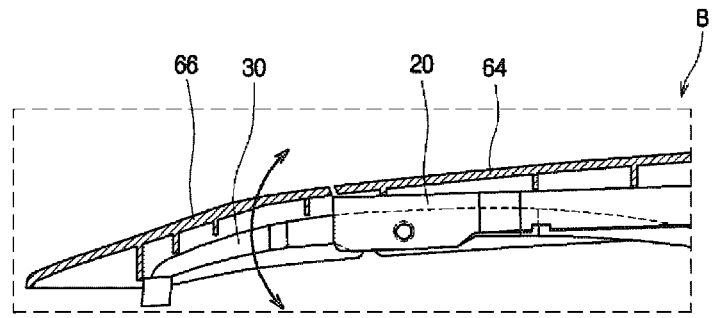

FIGS. 4 to 6 are cross-sectional views showing the wiper device in accordance with an embodiment of the present invention.

As shown in FIG. 4, the cover member 60 of the present embodiment includes a center cover 62, which is coupled to the frame 10 and covers the frame 10 and the inside arms 22 of the first levers 20, a pair of first extension covers 64, each of which is coupled to the outside arm 24 of the first lever 20 and covers the outside arm 24 and a portion of the second lever 30, and a pair of second extension covers 66, each of which is coupled to the second lever 30 and covers the remaining portion of the second cover 30.

Specifically, as shown in FIG. 5, since the first extension cover 64 coupled to the first lever 20 fluctuates in an integrated manner with the fluctuation of the first lever 20, the first lever 20 and the second lever 30, which is underneath the first lever 20, are prevented from being exposed when the wiper device is activated, allowing the wiper device to maintain a simple appearance.

Moreover, as shown in FIG. 6, the second extension cover 66 coupled to the second lever 30 fluctuates in an integrated manner with the fluctuation of the second lever 30, the second lever 30 can be prevented from being exposed, allowing the wiper device to maintain a simple appearance.

Although an embodiment of the present invention has been described, it shall be appreciated that various permutations and modifications are possible by those of ordinary skill in the art to which the present invention pertains without departing from the technical ideas and scopes of the present invention that are defined by the claims appended below.

It shall be also appreciated that there can be many other embodiments than the embodiment described above in the claims of the present invention.

What is claimed is:

1. A wiper device for removing foreign substances that are stuck on a windshield, comprising:

a frame;

a first lever, provided in a pair, each being hinge-coupled to either end of the frame and comprising an inside arm extended toward an inside of the frame from a hinge and an outside arm extended toward an outside of the frame from the hinge;

a second lever, provided in a pair, each being hinge-coupled to an end portion of the outside arm of the first lever;

a contact member, formed in the shape of a blade in close contact with the windshield so as to wipe out the foreign substances and being supported by an end portion of the inside arm of the first lever and both end portions of the second lever; and a cover member, covering the frame, the first lever and the second lever, wherein the inside arm of the first lever is formed to be shorter than the outside arm of the first lever in such a way that the inside arm fluctuates less than the outside arm does when the second lever fluctuates so as to lower a height of the cover member, and wherein the cover member comprises:

a center cover, coupled to the frame and covering the frame and the inside arm of the first lever;

a first extension cover, provided in a pair, each being coupled to the outside arm of the first lever, covering the outside arm and a portion of the second lever, and configured to fluctuate in an integrated manner with the first lever; and a second extension cover, provided in a pair, each being coupled to the second lever, covering the remaining portion of the second lever, and configured to fluctuate in an integrated manner with the second lever.

2. The wiper device of claim 1, further comprising an elastic member extended in a lengthwise direction of the contact member to elastically support the contact member.

3. The wiper device of claim 2, wherein opposite-side lateral surfaces of the contact member are formed with a pair of installation grooves, respectively, in the lengthwise direction of the contact member, and wherein the elastic member comprises a pair of rail springs inserted in the installation grooves.

* * * * *